Figure 1:
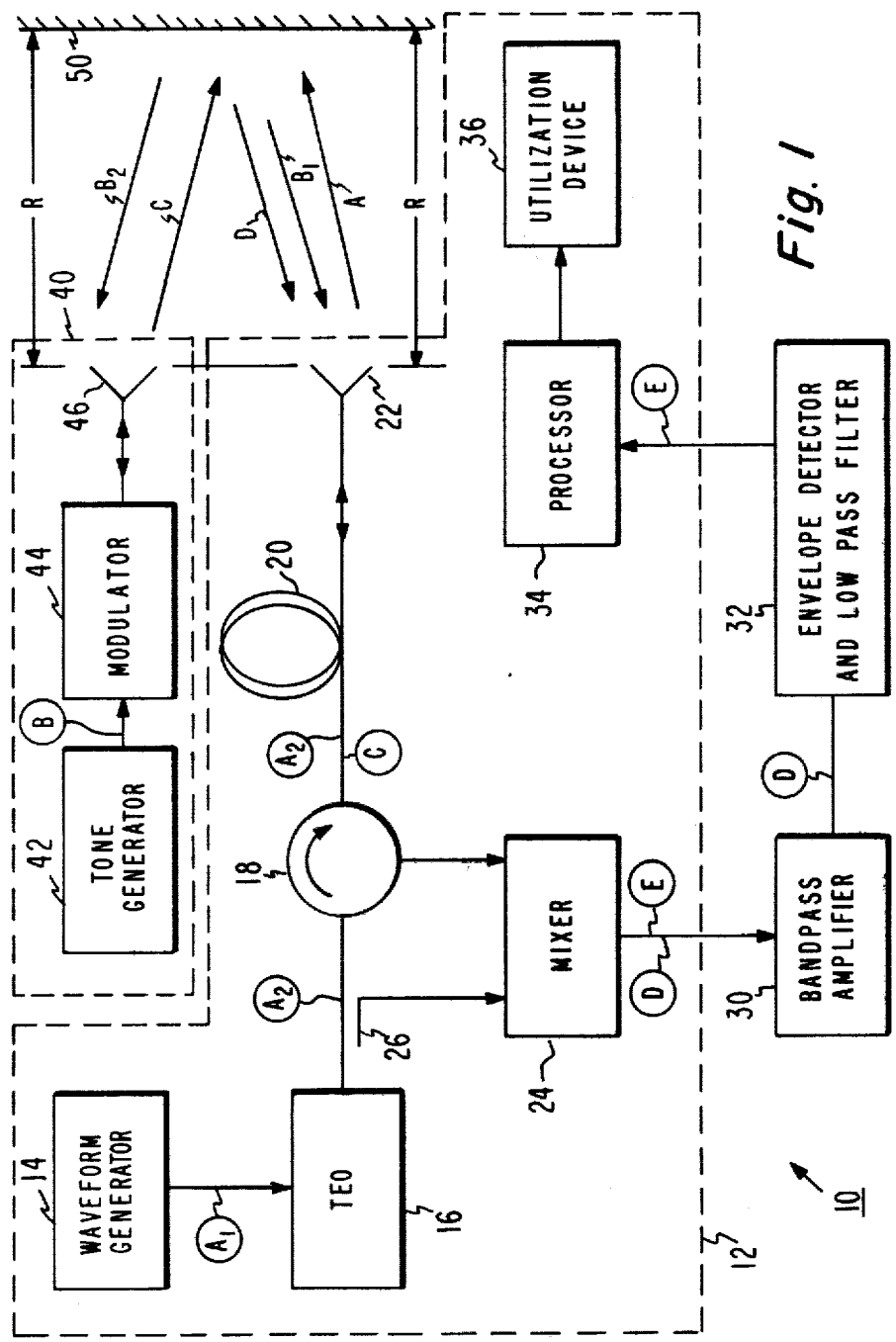

United States Patent [19]

Johnson

[11] 4,306,236
[45] Dec. 15, 1981

[54] RANGING RADAR INCLUDING A MODULATING REFLECTOR

[75] Inventor: Henry C. Johnson, Hillsborough Township, Somerset County, N.J.

[73] Assignee: RCA Corporation, New York, N.Y.

[21] Appl. No.: 105,123

[22] Filed: Dec. 19, 1979

[51] Int. Cl.³ ............................................. G01S 13/32
[52] U.S. Cl. ...................................................... 343/14
[58] Field of Search .......................................... 343/14

[56] References Cited

U.S. PATENT DOCUMENTS 3,522,602 8/1970 Ver Planck .................... 343/14X
4,003,049 1/1977 Sterzer et al. ............... 343/6.5 R X Primary Examiner—T. H. Tubbesing
Attorney, Agent, or Firm—Samuel Cohen; Robert L. Troike; Raymond E. Smiley

[57] ABSTRACT

A ranging radar of the radio frequency (RF) frequency modulated-continuous wave (FM-CW) type transmits an RF FM-CW signal to a reflecting surface at an unknown range R from the radar. The reflecting surface reflects the signal to a modulating device. The modulating device further modulates the signal at a frequency F which is high in comparison to the modulating frequency of the FM-CW signal. The further modulated signal is transmitted by the device to the reflecting surface and back to the ranging radar where it is subtractively mixed with a sample of a transmitted signal. The mixed signal is at frequency F amplitude modulated by a beat frequency, the period of which corresponds to range R. The frequency F is removed from the mixed signal leaving the beat frequency signal from which is determined range R.

9 Claims, 2 Drawing Figures

4,306,236

RANGING RADAR INCLUDING A MODULATING REFLECTOR

This invention is concerned with ranging radars and more particularly ranging radars of the frequency modulated-continuous wave type.

Radars of the frequency modulated-continuous wave (FM-CW) type are conventionally used in determining the range of an object, containing the radar, relative to some radio frequency (RF) signal reflecting surface. As known to those skilled in the art, such radars include an FM-CW RF signal producing circuit, a transmitting and receiving antenna for transmitting the RF signal and for receiving reflected signals from the reflecting surface, a mixer for mixing the transmitted and reflected signals to obtain a beat frequency and an amplifier to amplify the beat frequency signal. For a triangularly shaped frequency modulated waveform of frequency excursion $2 \cdot \Delta F$ and period $1 \div f_m$, the beat frequency is utilized to obtain the range by means of the following formula:

$$R = \frac{f_b \cdot C}{8 \cdot \Delta F \cdot f_m} \quad (1)$$

where $f_b$ is the beat frequency and C is the speed of light.

Since for a given modulating waveform, C, $f_m$ and $\Delta F$ are known and fixed:

$$R = K f_b \quad (2)$$

Thus, once $f_b$ is known, R can easily be computed. To enable an accurate determination of range to be made, the frequency $f_b$ must be determined between turn-around points of the modulating waveform and for short ranges where there are few beat frequency cycles, the beat frequency $f_b$ is typically determined by measuring the period of one cycle. For very short ranges and for given values of $f_m$ and $\Delta F$, as set by government regulatory authorities, less than one cycle of beat frequency occurs between modulating waveform turn-around points making measurement of $f_b$, and therefore determination of range impossible.

It is known to increase the apparent range between the radar and reflecting surface by incorporating a delay line into the radar to increase the apparant range such that at least 1.5 cycles of beat frequency occurs between modulation waveform turn-around points. A minimum of 1.5 cycles is required to ensure a full beat frequency period regardless of phase. It is also known to utilize a microprocessor or equivalent dedicated circuits to determine the beat frequency period, the apparent range and the actual range between the radar and reflecting surface.

Such a solution has, however, several drawbacks. First, the required length of delay line increases as the minimum range decreases. For many short range applications, the delay line might be several times longer than the minimum range. Since range measurement accuracy relates to the combined range of the effective delay line range plus the range to the reflecting surface, the resultant percentage error for the range to the reflecting surface, is much higher than it would be if the delay line were not required.

Second, the beat frequency signal amplifier must be of very wide bandwidth to prevent phase shifts of its output signal caused by the discontinuties that occur at the turn-around points of the modulating waveform. This wide bandwidth dictates the necessity for a relatively expensive single or double balanced mixer having very stringent balance and isolation characteristics, since relatively small imbalances within the mixer will result in inaccuracte measurements of the beat frequency period.

Third, separate transmit and receive antennas are required to maximize the transmit-receive isolation necessary for a ranging radar system utilizing a delay line. A single transmit-receive antenna system would result in phantom range signals originating from the imperfect antenna/free space match. These signals would interfere with the accuracy of the desired total range measurement.

In accordance with a preferred embodiment of the present invention, an RF FM-CW ranging radar for measuring the range to an RF signal reflecting surface comprises in combination, means producing an RF FM-CW signal at a relatively low modulation rate, means including a first antenna means for transmitting the RF signal to the reflecting surface, means including a second antenna means for receiving the FM-CW signal reflected from the reflecting surface, means responsive to the signal reflected to the second antenna means for further modulating the signal at a relatively high modulation rate and for retransmitting the further modulated signal to the reference surface to be thereby reflected to the first antenna means, means responsive to the further modulated signal at the first antenna means and responsive to the transmitted RF FM-CW signal for producing a signal which has a relatively low frequency component indicative of range of the surface relative to the first antenna means and a relatively high frequency component corresponding to that of the further modulating signal, means responsive to said signal having high and low frequency components, for extracting said signal indicative of said range and means responsive to said extracted signal for determining the range.

Figure 2:
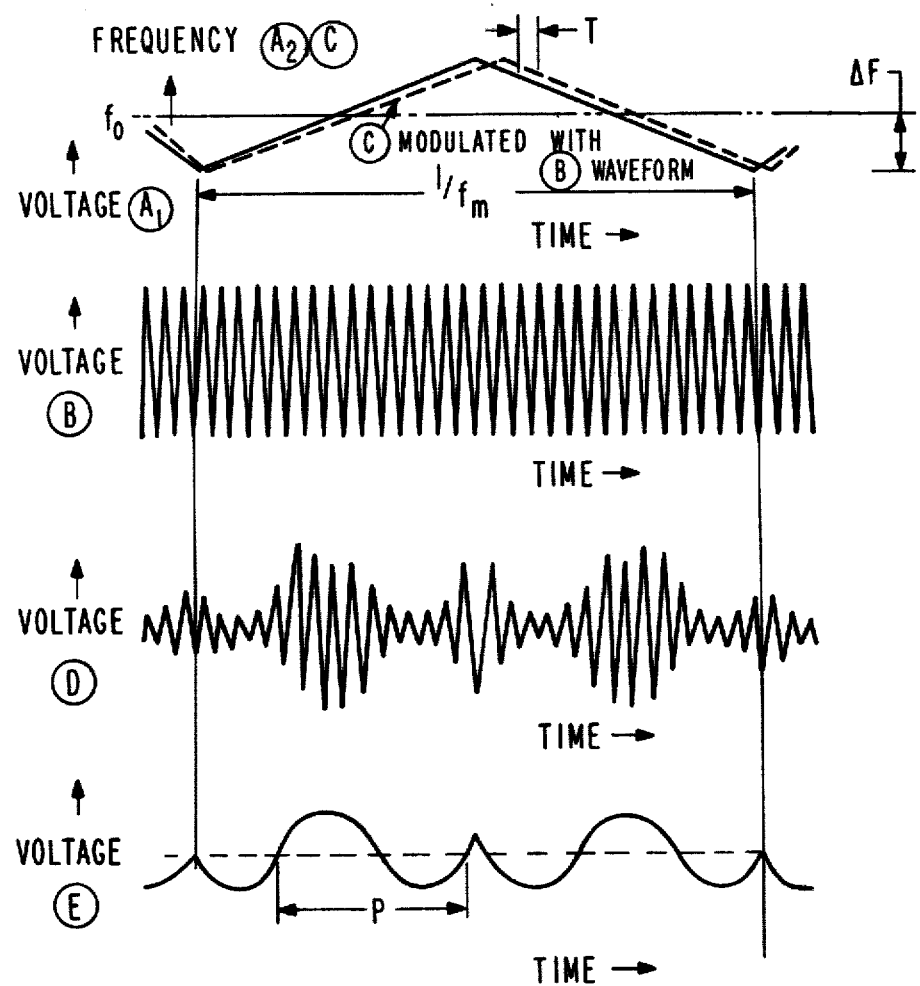

In the drawing:

FIG. 1 is a block diagram of a FM-CW radar ranging system in accordance with a preferred embodiment of the invention; and FIG. 2 is a set of waveforms useful in undestanding the operation of the system of FIG. 1.

Referring to FIG. 1, a ranging radar 10 of the FM-CW type includes conventionally arranged components within dashed lines 12. A waveform generator 14 generates a signal at frequency $f_m$ with a triangular shaped waveform of amplitude versus time as illustrated in FIG. 2, waveform $A_1$, having solid lines (hereinafter waveform $2A_1$). The encircled letters such as $A_1$, $A_2$, B etc. at various points in FIG. 1 relate to similarly legended waveforms in FIG. 2.

Waveform generator 14 is coupled to a means for producing a radio frequency (RF) signal at frequency $f_o$ such as a transferred electron oscillator (TEO) 16 (sometimes referred to as Gunn or bulk type oscillator) for the purpose of modulating the RF signal with the signal with the triangular waveform $2A_1$. The resulting signal has a waveform $2A_2$ which is a plot of frequency versus time. This waveform $2A_2$ which represents frequency change $\Delta F$ above and below frequency $f_o$ as a function of time, is identical in shape to waveform $2A_1$. Waveform $2A_2$, as illustrated, has a relatively low modulation frequency $f_m$, where typically $f_o=10.525$ GHz, $\Delta F = 25$ MHz and $f_m = 100$ Hz.

TEO 16 is coupled to a circulator 18 which is in turn coupled to an RF signal delay means such as a delay line 20. For reasons to be discussed, delay line 20 in the instant system may be of such length as to provide a substantially shorter delay than that of the delay line in the prior art system to provide a given accuracy of range relative to a reference surface at a given range or may not be needed whereas in the prior art, a delay line is needed.

Delay line 20 is coupled to a suitable antenna means 22 such as a microwave horn antenna for transmitting the FM-CW radio frequency signals waveform $2A_2$, in the direction of arrow A toward an RF reflecting surface 50. Surface 50 may be a solid surface. Alternatively, it may have a liquid surface such as the surface of a liquid flowing in a river or in a pipe. In particular, surface 50 may be the surface of sewerage effluent flowing through a sewer pipe. Surface 50 may be positioned at any desired range R from antenna 22 where R is to be determined by system 10.

In a manner to be hereinafter described, signals indicated by arrows $B_1$ and D are reflected to antenna means 22 by surface 50 and are passed back through delay line 20 and circulator 18 to a mixer 24. The mixer also receives a sample of the transmitted waveform by means of a directional coupler 26. Mixer 24 is coupled to a bandpass amplifier 30. Amplifier 30 is coupled to an envelope detector and low pass filter 32 which is in turn coupled to signal processing circuitry 34. Amplifier 30 and filter 32 are not part of conventional ranging radar 12. Processing circuitry 34 is coupled to a suitable utilization device 36, such as for example a device for displaying range determined by the system 10.

The conventional ranging radar elements within dashed lines 12 are described in detail in an article entitled, "SPEED SENSORS FOR LOCOMOTIVES," by the instant inventor, in RCA Engineer, August, 1976, pp. 34-37.

Radar system 10 also includes a signal modulating reflective device 40. Reflective device 40 includes a tone generator 42 coupled to a modulator 44. Modulator 44 is in turn coupled to a transmit-receive antenna 46 similar to antenna 22. The beam widths of antennas 22 and 46 are such that a signal transmitted from either of these antenna to surface 50 is received by the other antenna. Further, although not essential, it is desirable that both antennas 22 and 46 be positioned the same distance from surface 50. Tone generator 42 provides an amplitude or phase modulating tone signal of a frequency many times that of the modulating frequency of the signal produced by waveform generator 14. Thus, by way of example, tone generator 42 may produce a signal waveform 2B of, for example, 100 kHz for a modulation frequency of 100 Hz from generator 14. Clearly, the waveform 2B is shown at substantially less than 100 kHz for purposes of drawing clarity. Device 40 is described in more detail in U.S. Pat. No. 4,003,049 issued Jan. 11, 1977 to F. Sterzer, et al.

Antenna 46 receives the modulated signal of waveform $2A_2$ reflected from surface 50 as indicated by arrow $B_2$. The modulated signal received at the antenna 46 is further phase or amplitude modulated in modulator 44 by the waveform produced by tone generator 42. This further modulated signal is transmitted back through antenna 46 to reflecting surface 50 as indicated by arrow C and then reflected from surface 50 back to antenna 22 as indicated by arrow D. Also as above mentioned, a signal indicated by arrow $B_1$, is reflected back to antenna 22 by surface 50. The signal indicated by arrow $B_1$ is not further modulated by device 40.

The signal reflected back to antenna 22 appears as waveform 2C indicated by dashed lines. Waveform 2C is not illustrated with the further modulation provided by device 40. Waveform 2C, as illustrated, is identical to waveform $2A_2$, except that waveform 2C is displaced by time T from waveform $2A_2$, where T is a direct function of the range of the reflecting surface 50 from antennas 22 and 46 and including the simulated range provided by the additional two-way delay of delay line 20. The delay is present both on the transmitted waveform from antenna 22 and on the received waveform at antenna 22.

The operation of FIG. 1 will now be described with reference as appropriate to the waveforms of FIG. 2. Waveform generator 14 produces a signal with a triangular modulating waveform as illustrated in waveform $2A_1$. Transferred electron oscillator 16, produces a signal with a carrier frequency of $f_o$ which is modulated by the signal from generator 14 to thus produce a signal with a triangularly modulated waveform in the frequency spectrum as illustrated in waveform $2A_2$, that is, waveform $2A_2$ has a center frequency of $f_o$ with excursions above and below that amount of frequency $\Delta F$ with the excursions occurring with a period of $1 \div f_m$. The RF FM-CW waveform $2A_2$ is passed by circulator 18 to delay line 20 where after a suitable delay D the waveform appears at antenna 22. The RF signal is transmitted by antenna 22 in a direction toward surface 50 as indicated by arrow A. The signal is reflected back from surface 50 toward antenna 22 as indicated by arrow $B_1$ and toward antenna 46 of modulating device 40 as indicated by arrow $B_2$, as will hereinafter be described, the signal returned directly to antenna 22 in response to reflection from surface 50 will not be passed through bandpass amplifier 30.

The signal reflected from surface 50 to antenna 46 is applied to modulator 44 where is it further modulated by the signal produced by tone generator 42. The modulating signal as indicated in waveform 2B is much higher in frequency than is the frequency of waveform $2A_2$. The further modulated signal is retransmitted by antenna 46 back to surface 50 as indicated by arrow C. That signal is then reflected by surface 50 back to antenna 22 as indicated by arrow D.

The final reply signal from circuit 40 is subtractively mixed by mixer 24 with a sample of the original transmitted frequency (waveform $2A_2$). The output difference signal of mixer 24 is the difference between the sampled signal from coupler 26 and the reply signal from device circuit 40. The difference signal is an alternating signal having a frequency which is the same as that produced by tone generator 42 and is amplitude modulated by the beat frequency associated with the value of the range of surface 50 from antennas 22 and 46, as illustrated in waveform 2D.

Simultaneous with the receipt of the signal from circuit 40, as previously indicated, the signal transmitted by antenna 22 is reflected back from surface 50 directly to antenna 22 and is also passed by a circulator 18 and subtractively mixed in mixer 24 with the sample signal supplied by directional coupler 26 to produce a beat frequency signal of a waveform similar to that illustrated in waveform 2E of a few hundred hz for ranges of interest. Bandpass amplifier 30 is tuned to pass and amplify only signals at the frequency produced by tone generator 42 that is, signal of 100 kHz. Therefore, bandpass amplifier 30 passes only signals illustrated at waveform 2D and not signals illustrated at waveform 2E.

The signals of waveform illustrated as 2D is passed to envelope detector and low pass filter 32 of conventional design which removes the modulating frequency, that is waveform 2B, and passes only the beat frequency, that is waveform 2E. Waveform 2E is processed by processor 34 which determines it's period P and, from that, determines the range R of the antennas 22 and 46 from the surface 50 and any further range simulated by delay 20 as described in the aforementioned RCA Engineer Article from which may be subtracted the delay simulated range to determine R.

In contrast to the earlier given equation for range (equation 1) with the arrangement as illustrated in FIG. 1, the equation for range is:

$$R = \frac{f_b \cdot C}{2 \cdot 2 \cdot 8 \cdot \Delta F \cdot f_m} \qquad (3)$$

This equation assumes both antennas 22 and 46 are the same distance R from surface 50 and assumes no delay line 20. It will not noted that equation 3 differs from equation 1 in that an additional factor of 4 (2·2) appears in the denominator of equation 3. That is, for a given R, the beat frequency of equation 3 will be four times that of the beat frequency associated with equation 1.

The origin of the two 2's in the denominator of equation 3 is as follows. One of the 2's is due to the additional doubled length of total signal path. The signal must travel twice the round trip distance from either antenna to the surface 50 assuming that antennas 22 and 46 are equidistant from surface 50.

The second 2 in the denominator is due to the fact that envelope detector 32 will provide a beat frequency signal which is twice that of the beat frequency signal obtained in a prior art system lacking a modulating reflector.

There are several advantages of the arrangement shown in FIG. 1 over the prior art system.

Since there is a factor of four times the beat frequency for a given target range the minimum attainable range without the use of a delay line is one-fourth that of the prior art system. An accuracy improvement factor of four is also achieved at these short ranges since a given range change results in four times the change in the frequency. Although two antennas are required in the present system as in the prior art system the effective gain is substantially increased from $G^2$ to $G^4$ assuming equal gain antennas of gain G in the present and prior art systems. This results in narrower effective beamwidth than would be obtained in the prior art system using antennas of similar size. The circuit arrangement of FIG. 1 does not require an expensive, high isolation or well balanced mixer since the low frequency components associated with the mixer imbalance are not passed by bandpass amplifier 30.

I claim:

1. A radio frequency (RF) frequency modulated-continuous wave (FM-CW) ranging radar system for measuring the range to an RF reflecting surface, comprising in combination:

means producing an RF FM-CW signal at a relatively low modulation rate f;

means including a first antenna means for transmitting said signal to said reflecting surface;

means including a second antenna means for receiving said RF FM-CW signal affected by said surface;

means coupled to said second antenna means and responsive to said signal reflected thereto for further modulating said signal at a relatively high rate F, where F>>f, and for retransmitting said further modulated signal by said second antenna means to said reflecting surface to be reflected thereby to said first antenna means;

means responsive to said further modulated signal received at said first antenna means and to said transmitted RF FM-CW signal for producing a signal having a relatively high frequency corresponding to that of said further modulating signal of rate F amplitude modulated by a relatively low frequency signal indicative of the range of said reflecting surface from said first and second antenna means;

means responsive to said signal having said relatively high frequencey modulated by said relatively low frequency for extracting said signal indicative of said range; and means responsive to said extracted signal for determining said range.

2. The combination as set forth in claim 1, wherein said means producing said RF FM-CW signal includes means producing a signal which is triangularly modulated as a function of frequency.

3. The combination as set forth in claim 1, wherein said first antenna means is a single antenna for both transmitting and receiving RF signals.

4. The combination as set forth in claim 1 or claim 3, wherein said second antenna means is a single antenna for both transmitting and receving RF signals.

5. The combination as set forth in claim 1, wherein said means for further modulating said signal reflected to said second antenna means includes means for amplitude modulating said signal received at said second antenna means.

6. The combination as set forth in claim 1, wherein said means for further modulating said signal reflected to said second antenna means includes means for phase modulating said signal received at said second antenna means.

7. The combination as set forth in claim 1, wherein said means for extracting said signal indicative of range comprises an envelope detector and low pass filter, coupled to said means responsive to said further modulated signal.

8. The combination as set forth in claim 1, wherein said means responsive to said further modulated signal received at said first antenna means and to said transmitted RF FM-CW signal is a mixer for subtractively mixing said two signals received.

9. The combination as set forth in claim 8, wherein said signal transmitted by said first antenna means to said reflecting surface is additionally reflected thereby back to said first antenna means without said further modulation and wherein said mixer is responsivve to said transmitted RF FM-CW signal and to said reflected non-further modulated signal for subtractively mixing the two signals to produce a beat frequency output signal indicative of the range between said first antenna means and reflecting surface, and further including a filter means coupled to said mixer for passing only that signal which contains said relatively high frequency and for not passing said beat frequency signal.

* * * * *